RELATIONSHIP BETWEEN REGENERATOR BED TEMPERATURE AND CARBON ON REGENERATED CATALYST AT VARYING CATALYST HOLDING TIMES.

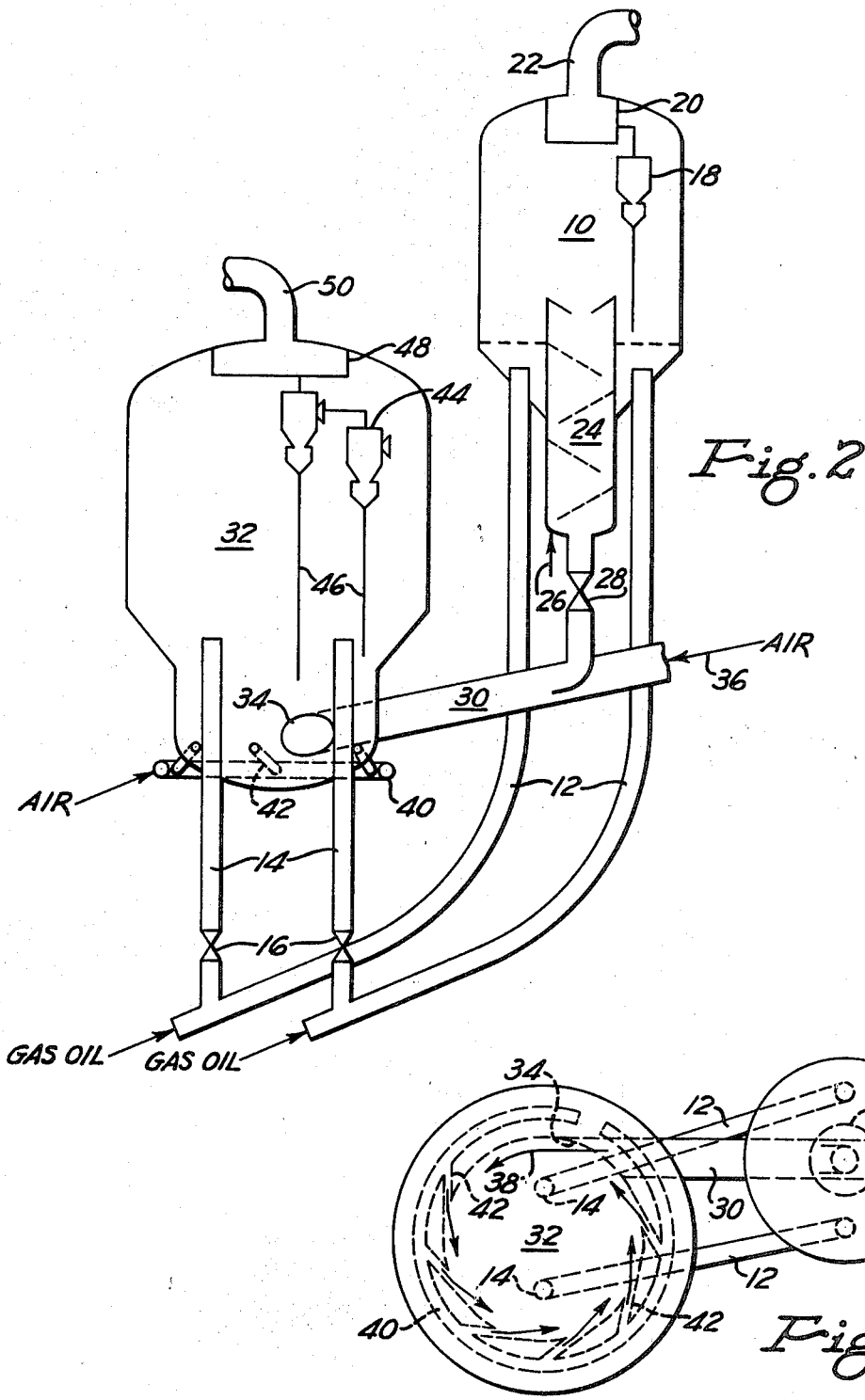

INVENTOR.
FREDERICK K. WHITE

United States Patent Office 3,647,714
Patented Mar. 7, 1972

3,647,714
CATALYST REGENERATION WITH TRANSFER LINE COMBUSTION AND DISPERSE PHASE DISCHARGE INTO A REGENERATOR
Frederick K. White, Allison Park, Pa., assignor to Gulf Research & Development Company, Pittsburgh, Pa.
Filed May 14, 1969, Ser. No. 824,598
Int. Cl. B01j 11/72, 11/04
U.S. Cl. 252—417
6 Claims

ABSTRACT OF THE DISCLOSURE

When spent fluid cracking catalyst is at least partially regenerated by burning of carbon in the transfer line leading to the regenerator and the temperature in the regenerator chamber is at least 1220° F., regenerator residence times as low as 3 to 10 minutes provide carbon on regenerated catalyst levels as low as about 0.2 weight percent.

---

Figure 1:
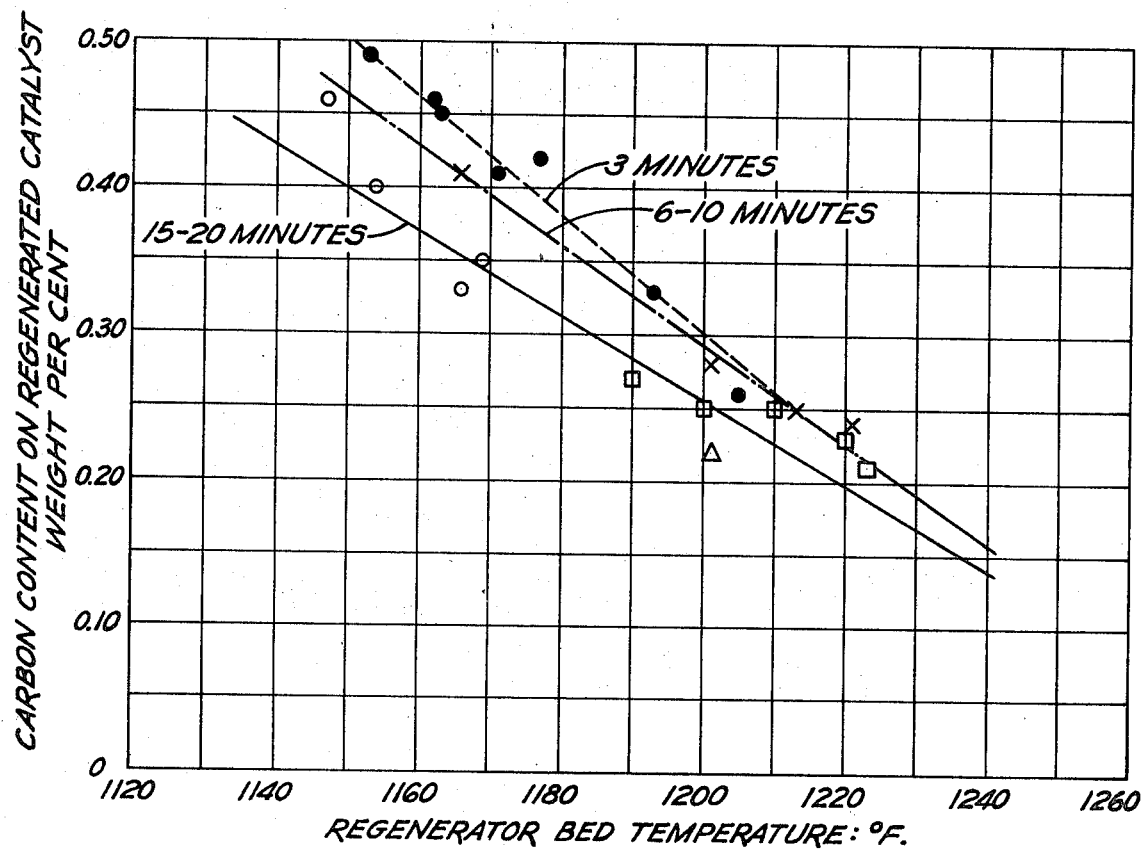

This invention relates to an improved method for the regeneration of catalyst employed in fluid catalytic cracking processes.

In accordance with this invention spent catalyst from a fluid catalytic cracking reactor is partially regenerated in the transfer line leading to the regenerator chamber wherein its regeneration is completed. At least a portion of the total quantity of combustion air stoichiometrically required to remove the carbon on the spent catalyst by burning is introduced into the transfer line leading to the regenerator to fluidize the catalyst and to burn a portion of the carbon on the catalyst in the transfer line. Furthermore, the combustion in the transfer line causes the catalyst to enter the regenerator as a non-dense or dispersed phase because it contains air and flue gas, rather than as a dense phase, so that combustion of carbon within the regenerator proceeds in a more advantageous manner.

In the absence of transfer line combustion, a transfer line delivers catalyst to its associated regenerator as a downflowing dense phase. When the entire supply of combustion air is supplied to the bottom of a regenerator to which catalyst is delivered as a dense phase, channeling of upflowing air occurs resulting in diminished effectiveness of the air. The channeling induces zones of local overheating in the bed resulting in the danger of localized sintering of catalyst. This situation often requires a reduction in the quantity of air charged so that in order to protect localized zones against overheating only a reduced air supply is available for relatively cool regions of the bed. Conversely, if a sufficiently high temperature is to be achieved at the top of a dense phase catalyst bed in a regenerator wherein channeling of air is occurring, it is frequently necessary to tolerate locally overheated regions at the bottom or middle of the bed.

Transfer line combustion avoids the introduction of a dense catalyst phase to the regenerator but rather charges a hot, non-dense, dilute catalyst phase into the regenerator. Transfer line combustion is advantageous whether the transfer line feeds catalyst to the top or the bottom of a regenerator bed, but is particularly advantageous when the transfer line feeds catalyst to the bottom of a regenerator bed. When the transfer line feeds catalyst directly to the bottom of the regenerator bed, the dilute or dispersed catalyst phase permits oxygen or air to diffuse uniformly through the lower regions of the catalyst bed, thereby avoiding local overheating. It furthermore allows the upflowing oxygen or air in the regenerator chamber to flush combustion gases from the lower regions of the bed, thereby further tending to avoid local overheating at the bottom of the bed while providing a continuous and uniform source of heat to the top of the bed whereat the oxygen level is the lowest. By this arrangement the highest oxygen level and the highest level of carbon on catalyst both occur where the bed is the least dense and excellent flushing of hot flue gases is possible to prevent local overheating, while the lowest oxygen level and the lowest level of carbon on catalyst both occur at the densest portion of the bed whereat the problem of local overheating is the least severe.

It is important to have a high temperature at the top of the bed in order to burn off the most refractory carbon just before the catalyst leaves the regenerator. It is also important to have a sufficient quantity of free oxygen at the top of the bed coupled with the high temperature to accomplish combustion of as much of the most refractory carbon as possible. However, there should not be such an excess of oxygen that there is an excessive amount of afterburning in the flue gas above the bed. Ideally, a stoichiometric amount of oxygen to remove all the carbon from the catalyst coupled with a high temperature at the top of the bed would provide best results. Generally, about 11.5 pounds of oxygen are required for each pound of coke or carbon burned anywhere in the regenerator.

It has now been discovered that when transfer line combustion is accompanied by a temperature in the catalyst bed in the regenerator chamber of at least about 1220° F. the residence time required to provide a high level of carbon removal from the catalyst is considerably reduced. It has now been found that at regenerator temperatures below 1220° F. when employing transfer line combustion, extension of catalyst regenerator residence times above 10, 15 or 20 minutes have a considerable effect upon the level of carbon remaining on the regenerated catalyst. However, at regenerator temperatures of 1220° F. or higher, such as 1240 or 1250° F., no appreciable further effect is achieved in reducing carbon level below a given value such as 0.25, 0.2 to 0.15 weight percent of catalyst by increasing residence times above about 3 to 10 or even 15 minutes.

The use of regenerator temperatures as high as those of the present invention is ordinarily avoided because at these elevated temperatures autocombustion occurs in the flue gases after they leave the catalyst bed causing excessive temperature increases in those gases with the possibility of metallurgical damage to the regenerator chamber if not controlled.

Heretofore, the extent of carbon removal during regeneration has been considered highly dependent upon regenerator residence time and the discovery in accordance with this invention that there is no significant advantage to residence times longer than stated above permits a number of important advantages. First, a lower catalyst inventory is required. Secondly, a smaller regenerator chamber is adequate. Thirdly, and most importantly, since the make-up rate of fresh catalyst which is continually introduced to replace loss of fines through cyclone separators is substantially independent of catalyst inventory within the system but rather is generally based upon the rate and preheat temperature of hydrocarbon feed to the cracking unit, the smaller the catalyst inventory in the regenerator the greater will be the proportion of fresh catalyst in the total catalyst circulating to the reactor. Since fresh catalyst is more active for purposes of cracking than regenerated catalyst because it contains no carbon or metals deposit whereas regenerated catalyst will always contain some carbon and metals on its surface, the higher the proportion of fresh catalyst in the system the higher will be the activity of total catalyst charge to the reactor. For example, in a system wherein the regenerator residence time requires a catalyst inventory of 1,000 tons of catalyst and the catalyst make-up to replace losses is fixed at 3 tons a day, there will be 0.3 weight percent of fresh catalyst circulating in the system. However, if the regenerator conditions of the present invention permit a catalyst inventory of 500 tons, a make-up level of 3 tons a day would result in a circulating catalyst system containing 0.6 weight percent of fresh catalyst.

The present invention is applicable to the regeneration of any catalyst utilized in a fluidized reaction system which is regenerated by the addition of air or oxygen with or without fuel to reduce the level of carbon deposition thereon by burning to carbon monoxide and carbon dioxide. Typical fluid cracking catalysts are silica-alumina and aluminosilicates. Such catalysts when utilized in a hydrocarbon fluid catalytic cracking system generally exhibit a particle size distribution range as follows:

| Size (microns): | Weight percent |
|---|---|
| 0–20 | 0–5 |
| 20–45 | 20–30 |
| 45–75 | 35–55 |
| >75 | 20–40 |

The proportion of the total air requirement introduced to the transfer line is not critical. If desired the entire air requirement can be introduced to the transfer line and none directly to the regenerator chamber, On the other hand, if desired, between about 10 and 90 percent, generally, or between about 50 and 80 weight percent, preferably, of the total air requirement can be added to the transfer line, with the remainder introduced directly to the regenerator chamber. The combustion air can be accompanied by fuel to assist combustion if necessary. The transfer line can discharge into the top or the bottom of the bed in the regenerator, but preferably discharges into the bottom of the regenerator bed. Catalyst removal occurs from the end of the regenerator bed opposite from the end at which catalyst is admitted.

A series of tests were conducted to illustrate the advantage of the present invention. In all of these tests a spent crystalline aluminosilicate zeolite fluid cracking catalyst from a fluid hydrocarbon cracking unit after being disengaged from hydrocarbon reaction vapors was steam stripped and charged via a transfer line to a regenerator chamber. In general, the spent catalyst of all the tests contained about the same amount of carbon, i.e. between about 0.9 and 1.1 weight percent of carbon. All or a portion of the air stoichiometrically required for combustion of total carbon deposits was admitted to the upstream end of the transfer line so that fluidization of the dense catalyst phase, combustion and partial regeneration occurred in the transfer line, causing the catalyst to enter the bottom of the regenerator chamber as a nondense or dispersed phase admixed with hot flue gas and air and having a density as low as about 2 to 8 pounds per cubic foot. The burning mixture traveled through the transfer line at an increasing velocity within the range of about 20 to 60 feet per second and entered the bottom of the catalyst bed in the regenerator chamber. The catalyst above the inlet region is a dense phase and near the top of the bed the density was between about 18 and 22 pounds per cubic foot. Where additional combustion air was charged directly to the regenerator chamber it was introduced near the bottom of the chamber. Regenerated catalysts was removed from the top of the dense phase bed. Because air and catalyst flow cocurrently upwardly through the regenerator bed, the catalyst having the greatest amount of carbon is in the presence of the richest oxygen mixture while the catalyst having the least amount of carbon is in the presence of the leanest mixture. The flue gas leaving the top of the regenerator catalyst bed is at a temperature sufficiently high that the carbon monoxide it contains can react with any unused oxygen to form carbon dioxide and if this occurs to an extent sufficient to cause a temperature rise in the flue gas as it travels between the top of the bed and the top of the regenerator chamber sufficiently great that equipment damage might result in quantity of incoming air can be automatically reduced by means of a flue gas temperature controller, so that there will be little or no excess oxygen in the flue gas stream.

The results of these tests are shown in the following table and in FIG. 1.

| Figure 1 symbol | Percent of total air to transfer line | Catalyst inventory, tons | Catalyst circulation, rate, MLBS/hr. | Catalyst holding time, minutes | Carbon on regenerated catalyst, weight percent | Dense bed temperature, ° F. |
|---|---|---|---|---|---|---|
| ○ | 60 | 275 | 2,352 | 14.0 | 0.46 | 1,147 |
| ○ | 60 | 275 | 1,524 | 21.7 | 0.35 | 1,169 |
| ○ | 60 | 275 | 1,569 | 21.0 | 0.33 | 1,166 |
| ○ | 60 | 275 | 1,760 | 18.7 | 0.40 | 1,154 |
| △ | 100 | 675 | 5,171 | 15.7 | 0.22 | 1,201 |
| □ | 100 | 740 | 4,806 | 18.5 | 0.25 | 1,200 |
| □ | 100 | 740 | 4,933 | 18.0 | 0.27 | 1,190 |
| □ | 100 | 740 | 4,800 | 18.5 | 0.23 | 1,220 |
| □ | 100 | 740 | 4,800 | 18.5 | 0.21 | 1,223 |
| □ | 100 | 740 | 5,585 | 15.9 | 0.25 | 1,210 |
| X | 85 | 555 | 6,273 | 10.6 | 0.24 | 1,221 |
| X | 85 | 360 | 5,804 | 7.4 | 0.25 | 1,213 |
| X | 85 | 330 | 6,444 | 6.1 | 0.28 | 1,201 |
| X | 85 | 594 | 7,764 | 9.2 | 0.41 | 1,166 |
| ● | 60 | 40.5 | 1,719 | 2.8 | 0.46 | 1,162 |
| ● | 60 | 40.5 | 1,701 | 2.9 | 0.49 | 1,153 |
| ● | 60 | 40.5 | 1,673 | 2.9 | 0.41 | 1,171 |
| ● | 60 | 40.5 | 1,653 | 2.9 | 0.45 | 1,163 |
| ● | 60 | 40.5 | 1,686 | 2.9 | 0.42 | 1,177 |
| ● | 60 | 40.5 | 1,460 | 3.3 | 0.33 | 1,193 |
| ● | 60 | 40.5 | 1,460 | 3.3 | 0.26 | 1,205 |

FIG. 1 shows that the residence times required to achieve any given level of carbon on catalyst at catalyst dense phase bed temperatures well below 1200° F. vary widely. For example, in the various tests shown, to achieve a 0.40 weight percent level of carbon on regenerated catalyst, one set of tests required a regenerator residence time of 15 to 20 minutes at a temperature of 1150° F., another set of tests required a residence time of 6 to 10 minutes at a temperature of about 1169° F., while a third set of tests required a 3 minute residence time at a temperature of about 1175° F. However, FIG. 1 shows that all of the residence time curves tend to merge at temperatures of about 1220° F. and higher so that at temperatures of about 1220° F. or higher a carbon on catalyst level of about 0.20 weight percent or lower can be achieved at residence times of about 3 to 10 or 15 minutes or less without any necessity of extending the residence time. It is noted that the 3 minute residence time required to achieve a 0.2 weight percent level of carbon on catalyst in accordance with these tests would have to be extended to about a 30 minute residence time at substantially lower temperatures to achieve the same carbon on catalyst level. The residence times reported in the data refer to time in the regenerator chamber proper, the residence time during combustion in the transfer line leading to the regenerator chamber being negligible in comparison. The 0.2 weight percent carbon on catalyst level of these tests represents an advantageous degree of regeneration because in cracking a charge oil with the zeolitic catalysts tested a change from 0.3 to 0.2 weight percent of carbon on regenerated catalyst increases conversion 1.2 percent and $C_3+$ gasoline production 2.3 percent.

FIGS. 2 and 3 illustrate schematic side and top views, respectively, of one reactor-regenerator system suitable for carrying out the present invention. Referring to both FIGS. 2 and 3, 10 represents a cracking reactor to which a hydrocarbon to be cracked, such as gas oil, with or without steam is introduced through reactor transfer lines 12. The hydrocarbon charge is intermixed with hot regenerated catalyst in reactor transfer line 12 and said catalyst is admitted to the reactor transfer lines through regenerator catalyst standpipes 14 which are provided with slide valves 16. Hydrocarbon product and unreacted hydrocarbon leaves reactor 10 through cyclone separator 18, plenum chamber 20 and discharge line 22.

Spent catalyst to be regenerated falls through baffled stripper chamber 24 to which stream is charged through line 26 for the removal of hydrocarbon vapors from catalyst. Spent catalyst falls through slide valve 28 into regenerator transfer line 30 which enters regenerator chamber 32 tangentially through tangential opening 34 so that catalyst entering the regenerator chamber has a swirling motion imparted to it. Air is introduced to the inlet end of transfer line 30 through line 36 so that combustion occurs in transfer line 30 and a disperse phase of fluidized catalyst, air and combustion products enters chamber 32 with a swirling motion as indicated by arrow 38 in FIG. 3. The swirling motion helps to preserve the disperse or non-dense condition of the catalyst at the bottom of the regenerator chamber, thereby assisting combustion and helping incoming air to flush hot flue gases upwardly to help keep the bottom of the regenerator which is the zone of most intense combustion as cool as possible.

About 50 to 80 percent of the air admitted to the system can be charged through line 36 to the regenerator transfer line while the remainder of the combustion air can be charged directly to the regenerator chamber through air distributor ring 40 having a plurality of substantially equally spaced ducts 42 which direct air tangentially into regenerator chamber 32 in the same tangential direction as opening 34 provided for transfer line 30. In this manner, the air supplied directly to the regenerator does not disrupt but rather assists the swirling motion of the fluid catalyst and combustion gas mixture entering through transfer line 30.

It is seen that spent catalyst and combustion air is added to the bottom zone of the bed in regenerator chamber 32 while regenerated catalyst is removed from the top of the catalyst bed whereat the catalyst phase is dense. Regenerated catalyst then passes through open standpipes 14 for return to the reactor. Hot flue gas is removed from regenerator chamber 32 by passage through cyclone separator system 44 wherein catalyst fines are removed and returned to the dense bed of catalyst through lines 46 while hot flue gases are discharged through plenum chamber 48 and line 50 to a turbine, not shown, which compresses fresh air to be used for regeneration. Also, not shown, a temperature controller can be provided which measures the temperature of the flue gas entering cyclone separator system 44. An increase in said temperature above a predetermined level represents excessive afterburning of carbon monoxide to carbon dioxide in the flue gases above the dense upper zone of the catalyst bed and the controller can automatically reduce the quantity of air entering through the air distributor ring so that less oxygen will be available above the catalyst bed for combustion thereat or it can spray steam directly into the top of the regenerator chamber to lower the temperature of the flue gas directly.

I claim:

1. A process for reducing residence time of a catalyst bed in a fluid hydrocarbon cracking catalyst regenerator chamber for regenerating silica-alumina or zeolite cracking catalyst containing at least 0.5 weight percent carbon wherein the carbon level on the catalyst is reduced by burning to less than 0.25 weight percent carbon comprising charging catalyst to be regenerated into the regenerator chamber through a transfer line, introducing 10 to 100 percent of the combustion air to the transfer line wherein the velocity in the transfer line reaches 20 to 60 feet per second resulting in combustion in said transfer line, discharging the catalyst combustion mixture as a dispersed phase from the transfer line tangentially into the regenerator chamber, continuing combustion within said chamber at a temperature in the chamber catalyst bed of at least 1220° F. for a residence time of not more than 15 minutes, and withdrawing regenerated catalyst from said regenerator chamber.

2. The process of claim 1 wherein 60 to 100 percent of the combustion air is introduced to said transfer line.

3. The process of claim 1 wherein the transfer line discharges tangentially into the bottom of the bed in the regenerator chamber and catalyst is removed from the opposite end of the bed in the regenerator chamber.

4. The process of claim 1 wherein the transfer line discharges tangentially into the top of the bed in the regenerator chamber and catalyst is removed from the opposite end of the bed in the regenerator chamber.

5. The process of claim 1 wherein the residence time in the regenerator chamber is less than about 10 minutes.

6. The process of claim 1 wherein the temperature in the regenerator chamber catalyst bed is at least 1250° F. and the residence time in said regenerator chamber is less than about 3 minutes.

References Cited

UNITED STATES PATENTS

| | | | |
|---|---|---|---|
| 2,391,944 | 1/1946 | Carlsmith | 252—417 X |
| 2,873,175 | 2/1959 | Owens | 252—417 X |
| 2,906,703 | 9/1959 | Valle | 208—164 X |
| 2,981,695 | 4/1961 | Peery | 252—417 |
| 3,351,548 | 11/1967 | Payne et al. | 208—46 X |
| 3,394,076 | 7/1968 | Bunn Jr. et al. | 208—164 |
| 3,412,014 | 11/1968 | Mattix et al. | 208—164 |
| 3,494,858 | 2/1970 | Luckenbach | 208—164 |
| 2,752,291 | 6/1956 | Rex | 252—417 |
| 2,768,933 | 10/1956 | Burton et al. | 252—420 |
| 3,563,911 | 2/1971 | Pfeiffer et al. | 252—419 |

DANIEL E. WYMAN, Primary Examiner

P. E. KONOPKA, Assistant Examiner

U.S. Cl. X.R.

23—288 G; 208—164; 252—419